US011920609B2

(12) United States Patent
Konishi et al.

(10) Patent No.: US 11,920,609 B2
(45) Date of Patent: Mar. 5, 2024

(54) AXIAL FAN AND REFRIGERATION CYCLE APPARATUS

(71) Applicant: DAIKIN INDUSTRIES, LTD., Osaka (JP)

(72) Inventors: Hideaki Konishi, Osaka (JP); Naomi Abe, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 82 days.

(21) Appl. No.: 17/666,029

(22) Filed: Feb. 7, 2022

(65) Prior Publication Data

US 2022/0163049 A1 May 26, 2022

Related U.S. Application Data

(63) Continuation of application No. PCT/JP2020/030423, filed on Aug. 7, 2020.

(30) Foreign Application Priority Data

Aug. 9, 2019 (JP) ................................. 2019-147463

(51) Int. Cl.
*F04D 29/38* (2006.01)
*F04D 29/66* (2006.01)

(52) U.S. Cl.
CPC ........... *F04D 29/384* (2013.01); *F04D 29/38* (2013.01); *F04D 29/666* (2013.01); *F05D 2240/304* (2013.01)

(58) Field of Classification Search
None
See application file for complete search history.

(56) References Cited

U.S. PATENT DOCUMENTS 8,038,406 B2 * 10/2011 Tanigawa ................ F04D 29/34
416/223 R
9,051,941 B2 * 6/2015 Kojima ................. F04D 29/384
(Continued)

FOREIGN PATENT DOCUMENTS

JP 2005-140081 A 6/2005
JP 2008-51036 A 3/2008
(Continued)

OTHER PUBLICATIONS

International Preliminary Report of corresponding PCT Application No. PCT/JP2020/030423 dated Feb. 17, 2022.
(Continued)

*Primary Examiner* — Juan G Flores
(74) *Attorney, Agent, or Firm* — Global IP Counselors, LLP

(57) ABSTRACT

An axial fan rotates around a rotating shaft. The axial fan includes a hub, and a plurality of blades extending in a radial direction from the hub. Each blade includes a leading edge, a trailing edge including a depression, and a reinforcing protrusion located at least forwardmost and having a wall thickness thicker than a surrounding portion. As viewed along a rotating shaft direction, when a first virtual line and a second virtual line perpendicular to the radial direction are drawn, the reinforcing protrusion extends radially inside of the first virtual line and extends radially outside of the second virtual line, the first virtual line and the second virtual line respectively pass through a rearmost first end-point in the rotation direction on a radially inside of a rear end that substantially overlaps the depression, and a rear-most second endpoint on a radially outside of the rear end.

20 Claims, 10 Drawing Sheets

(56) References Cited

U.S. PATENT DOCUMENTS

| | | | | |
|---|---|---|---|---|
| 9,556,881 | B2 * | 1/2017 | Seiji | F04D 29/384 |
| 2008/0050240 | A1 * | 2/2008 | Tanigawa | F04D 29/388<br>416/223 R |
| 2014/0086754 | A1 * | 3/2014 | Seiji | F04D 29/384<br>416/237 |
| 2014/0363306 | A1 * | 12/2014 | Kojima | F04D 19/002<br>416/242 |

FOREIGN PATENT DOCUMENTS

| | | | |
|---|---|---|---|
| JP | 2013-136973 | A | 7/2013 |
| JP | 2014-105600 | A | 6/2014 |
| JP | 2014-206054 | A | 10/2014 |

OTHER PUBLICATIONS

International Search Report of corresponding PCT Application No. PCT/JP2020/030423 dated Oct. 13, 2020.

European Search Report of corresponding EP Application No. 20 85 2113.8 dated Aug. 25, 2022.

* cited by examiner

AXIAL FAN AND REFRIGERATION CYCLE APPARATUS

CROSS-REFERENCE TO RELATED APPLICATIONS

This is a continuation of International Application No. PCT/JP2020/030423 filed on Aug. 7, 2020, which claims priority to Japanese Patent Application No. 2019-147463, filed on Aug. 9, 2019. The entire disclosures of these applications are incorporated by reference herein.

BACKGROUND

Field of Invention

The present invention relates to an axial fan having a depression depressed in a rotation direction on a trailing edge of each blade, and a refrigeration cycle apparatus including the axial fan.

Background Information

Conventionally, as described in JP 2005-140081 A, there is an axial fan including a depression in each blade (described as a rear edge concave portion in 2005-140081 A). The depression is provided on a trailing edge of each blade.

SUMMARY

An axial fan according to one aspect rotates around a rotating shaft. The axial fan includes a hub, and a plurality of blades extending in a radial direction from the hub. Each of the blades includes a leading edge located forward of a rotation direction, a trailing edge located rearward, the trailing edge including a depression depressed forward in the rotation direction, and a reinforcing protrusion located at least forwardmost in the rotation direction of the depression and having a wall thickness thicker than a surrounding portion. As viewed along a rotating shaft direction, when a first virtual line and a second virtual line perpendicular to the radial direction are drawn, the reinforcing protrusion extends radially inside of the first virtual line and extends radially outside of the second virtual line, the first virtual line and the second virtual line respectively pass through a rearmost first endpoint in the rotation direction on a radially inside of a rear end that substantially overlaps the depression, and a rearmost second endpoint on a radially outside of the rear end.

DETAILED DESCRIPTION OF EMBODIMENT(S)

(1) Configuration of Refrigeration Cycle Apparatus

Figure 1:
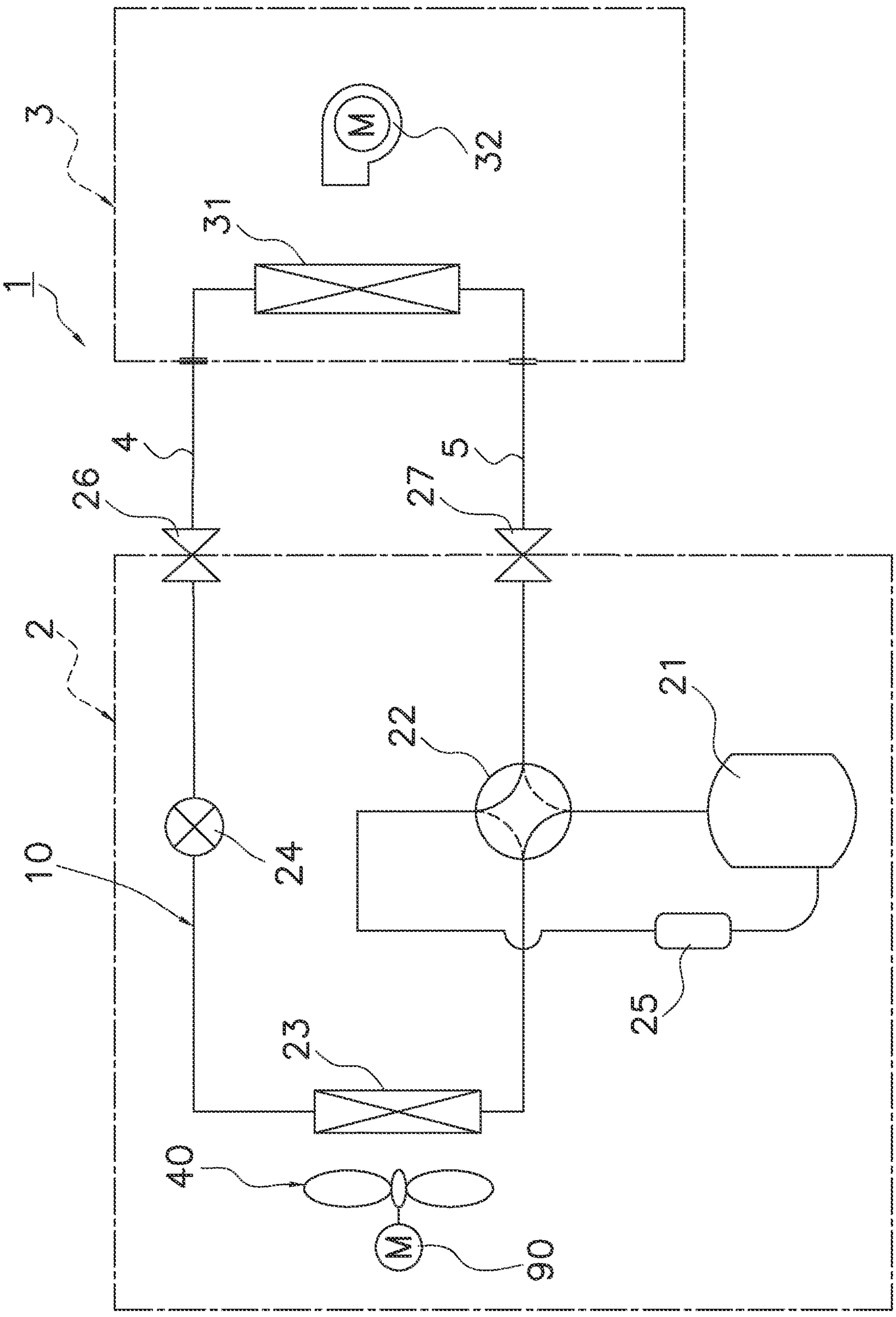
FIG. 1 is a circuit diagram showing a refrigerant circuit of an air conditioner according to an embodiment.

FIG. 1 is a diagram showing an air conditioner 1 as an example of a refrigeration cycle apparatus. The air conditioner 1 includes an outdoor unit 2, which serves as a heat source, and an indoor unit 3, which uses heat obtained by the outdoor unit 2. The outdoor unit 2 and the indoor unit 3 are connected to each other by refrigerant connection pipes 4 and 5. The outdoor unit 2 includes shutoff valves 26 and 27 for connecting to the refrigerant connection pipes 4 and 5.

A refrigerant circuit 10 is formed in the outdoor unit 2 and the indoor unit 3 connected by the refrigerant connection pipes 4 and 5. The refrigerant circuit 10 includes a compressor 21, a four-way valve 22, an outdoor heat exchanger 23, an expansion valve 24, an accumulator 25, and an indoor heat exchanger 31. The four-way valve 22 switches the direction in which a refrigerant flows, for example, between a cooling operation and a heating operation of the air conditioner 1.

During the cooling operation, the four-way valve 22 is switched such that the refrigerant flows through the route shown by the solid line. During the cooling operation, the high-temperature, high-pressure refrigerant discharged from the compressor 21 flows through the outdoor heat exchanger 23. The outdoor heat exchanger 23 exchanges heat between the outdoor air and the refrigerant. The refrigerant from which heat is taken away in the outdoor heat exchanger 23 is decompressed in the expansion valve 24. The refrigerant decompressed in the expansion valve 24 flows through the indoor heat exchanger 31. The indoor heat exchanger 31 exchanges heat between the indoor air and the refrigerant. The refrigerant that has obtained heat from the indoor air in the indoor heat exchanger 31 is taken into the compressor 21 through the four-way valve 22 and the accumulator 25. When passing through the accumulator 25, the refrigerant is separated into a gas refrigerant and a liquid refrigerant, and the gas refrigerant is mainly taken into the compressor 21. In this way, a vapor compression refrigeration cycle is performed in the refrigerant circuit 10, and the room is cooled by the indoor air from which heat is taken away by heat exchange in the indoor heat exchanger 31. The outdoor heat exchanger 23 is supplied with outdoor air by an outdoor fan 40. The indoor heat exchanger 31 is supplied with indoor air by an indoor fan 32. The indoor fan 32 is a cross-flow fan.

During the heating operation, the four-way valve 22 is switched such that the refrigerant flows through the route shown by the broken line. During the heating operation, the high-temperature, high-pressure refrigerant discharged from the compressor 21 flows through the indoor heat exchanger 31 through the four-way valve 22. The indoor heat exchanger 31 exchanges heat between the indoor air and the refrigerant. The refrigerant that has dissipated heat in the indoor heat exchanger 31 is decompressed in the expansion valve 24. The refrigerant decompressed in the expansion valve 24 flows through the outdoor heat exchanger 23. The outdoor heat exchanger 23 exchanges heat between the outdoor air and the refrigerant. The refrigerant that has obtained heat from the outdoor air in the outdoor heat exchanger 23 is taken into the compressor 21 through the four-way valve 22 and the accumulator 25. In this way, the vapor compression refrigeration cycle is performed in the refrigerant circuit 10, and the room is heated by the indoor air that has obtained heat by heat exchange in the indoor heat exchanger 31.

(2) Configuration of Outdoor Unit 2

Figure 2:
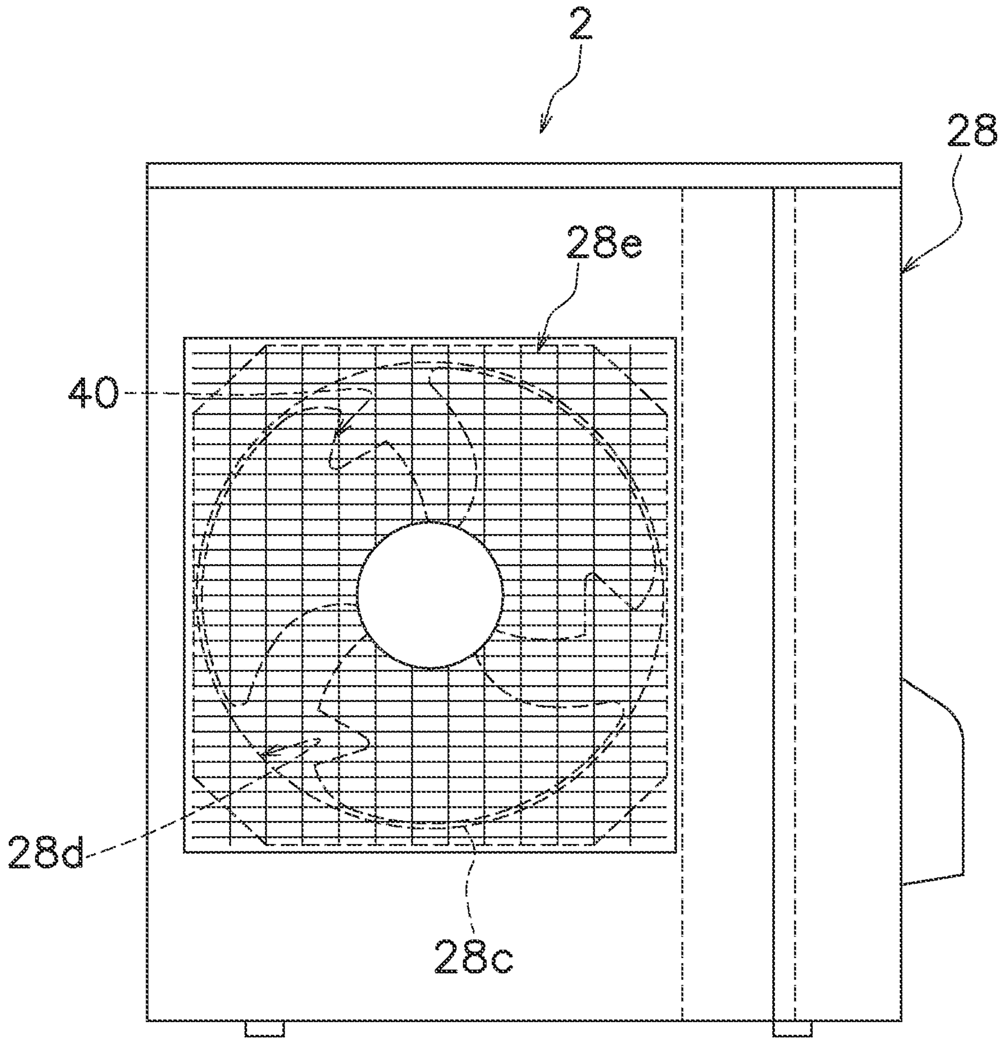
FIG. 2 is a front view showing an appearance of an outdoor unit of the air conditioner.
Figure 3:
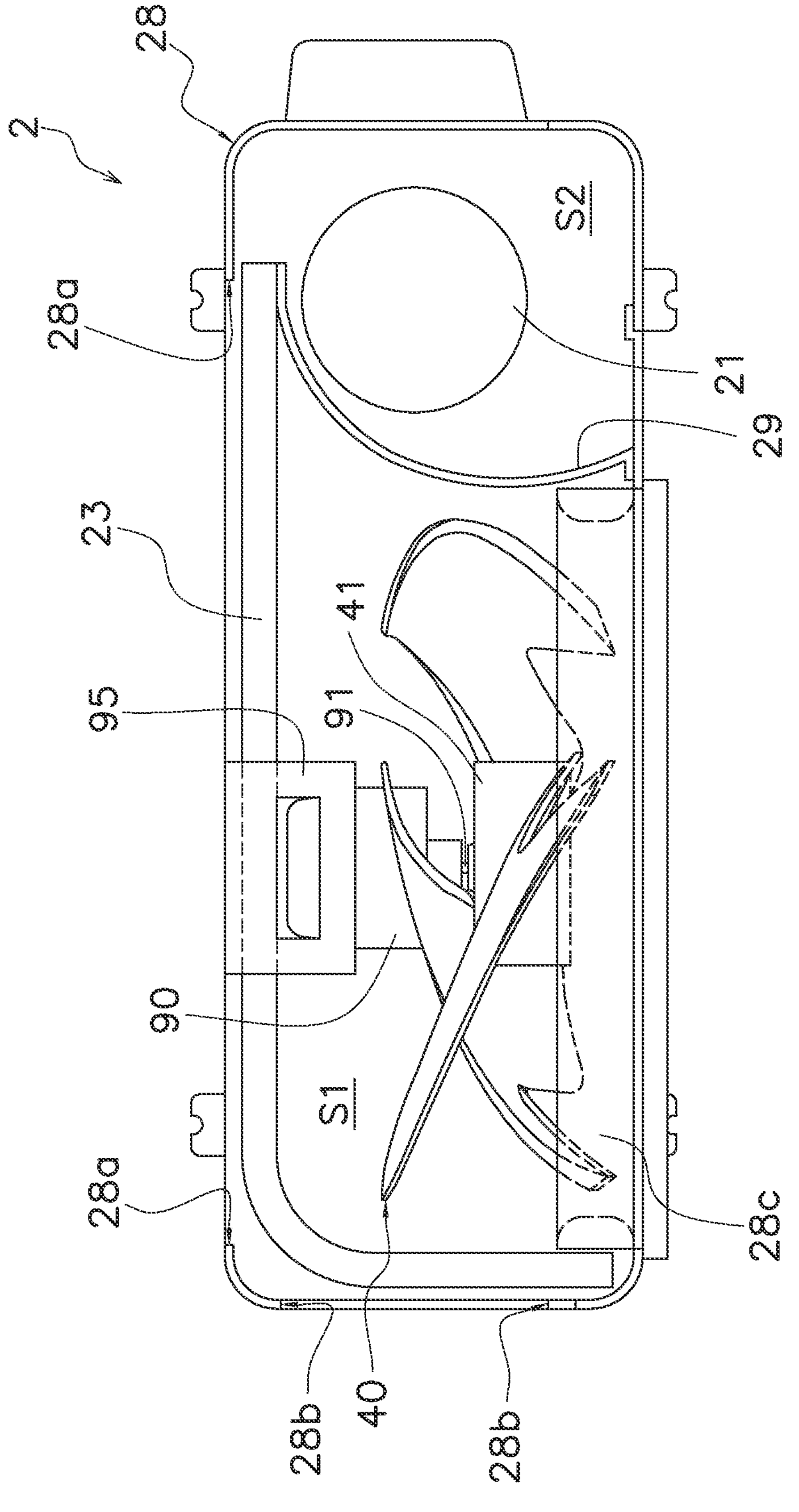
FIG. 3 is a schematic cross-sectional view for describing an internal structure of the outdoor unit of FIG. 2.

The outdoor unit 2 includes a casing 28 having a substantially rectangular parallelepiped appearance, as shown in FIGS. 2 and 3. In the outdoor unit 2, an internal space of the casing 28 is divided by a partition plate 29 into a fan chamber S1 and a machine chamber S2. In the machine chamber S2, in addition to the compressor 21 shown in FIG. 3, although illustration is omitted in FIG. 3, for example, the four-way valve 22, the expansion valve 24, and the accumulator 25 are disposed. In the fan chamber S1, the outdoor heat exchanger 23 and the outdoor fan 40 are disposed. The outdoor heat exchanger 23 is L-shaped in a plan view. However, the shape of the outdoor heat exchanger 23 used in the outdoor unit 2 is not limited to L-shaped.

In the casing 28, openings 28*a* and 28*b* connected to the fan chamber S1 are formed on the opposite side of the outdoor fan 40 across the outdoor heat exchanger 23. When the outdoor fan 40 is driven, the outdoor air flows into the fan chamber S1 from the openings 28*a* and 28*b* through the outdoor heat exchanger 23. In the casing 28, a bell mouth 28*c* is disposed on the opposite side of the outdoor heat exchanger 23 across the outdoor fan 40. The bell mouth 28*c* includes a circular opening 28*d* when viewed in a rotating shaft direction of the outdoor fan 40. When the outdoor fan 40 is driven, air is blown out from the inside of the fan chamber S1 to the outside through the bell mouth 28*c*. The circular opening 28*d* of the bell mouth 28*c* is covered by a grill 28*e*. When the outdoor fan 40 is driven, the outdoor air taken into the casing 28 from the openings 28*a* and 28*b* of the casing 28 is blown out of the casing 28 through the outdoor heat exchanger 23, the outdoor fan 40, the circular opening 28*d* of the bell mouth 28*c*, and the grill 28*e*. In this way, heat is exchanged between the outdoor air passing through the outdoor heat exchanger 23 and the refrigerant flowing through the outdoor heat exchanger 23.

The openings 28*a* and 28*b* of the casing 28 and the opening 28*d* of the bell mouth 28*c* are open even when the outdoor fan 40 is not driven. Therefore, if a strong wind blows outdoors, the strong wind blowing into the fan chamber S1 through the openings 28*a* and 28*h* or the opening 28*d* of the bell mouth 28*c* blows against the outdoor fan 40. The strong wind causes the outdoor fan 40 to rotate at a high speed, thereby generating a stress in the outdoor fan 40.

The outdoor fan 40 is driven by a fan motor 90. The fan motor 90 is supported by a fan motor base 95. The fan motor base 95 fixes the fan motor 90 to the casing 28 with the outdoor unit 2 installed such that a rotating shaft 91 of the fan motor 90 extends substantially horizontally. Here, the case where the fan motor 90 has the rotating shaft 91 is shown, but the outdoor fan 40 may have the rotating shaft. When the outdoor fan 40 is attached to the horizontally extending rotating shaft 91, the outdoor fan 40 generates an air flow that flows substantially horizontally.

(3) Outline of Configuration of Outdoor Fan

Figure 4:
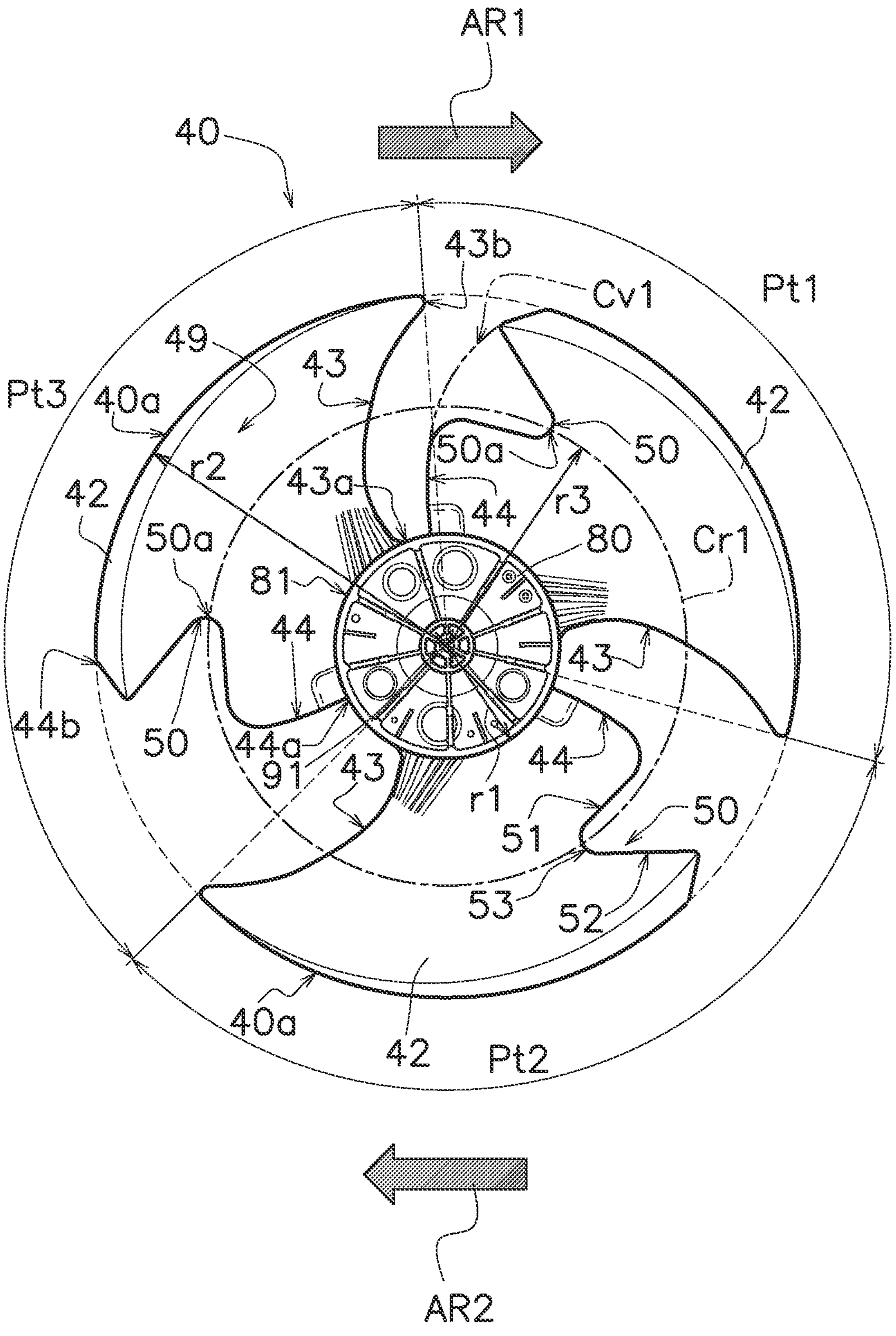
FIG. 4 is a rear view showing one example of an outdoor fan used in the outdoor unit of FIG. 2.

The outdoor fan 40 is an axial fan. The outdoor fan 40 includes a hub 80 and a plurality of blades 42 extending radially from the hub 80. FIG. 4 is a view showing the outdoor fan 40 viewed from the rear side (side of the outdoor heat exchanger 23). The surface of the blade 42 drawn in FIG. 4 is a negative pressure surface 49. In other words, the negative pressure surface 49 is a surface on the side on which air flows in (upstream in the air flow direction) when the outdoor fan 40 is rotated. A pressure surface 48 is a surface on the side on which air flows out (downstream in the air flow direction) when the outdoor fan 40 is rotated.

Each blade 42 includes a leading edge 43 located forward and a trailing edge 44 located rearward of the rotation direction (direction of arrows AR1 and AR2). The trailing edge 44 includes a depression 50 depressed in the rotation direction.

Figure 5:
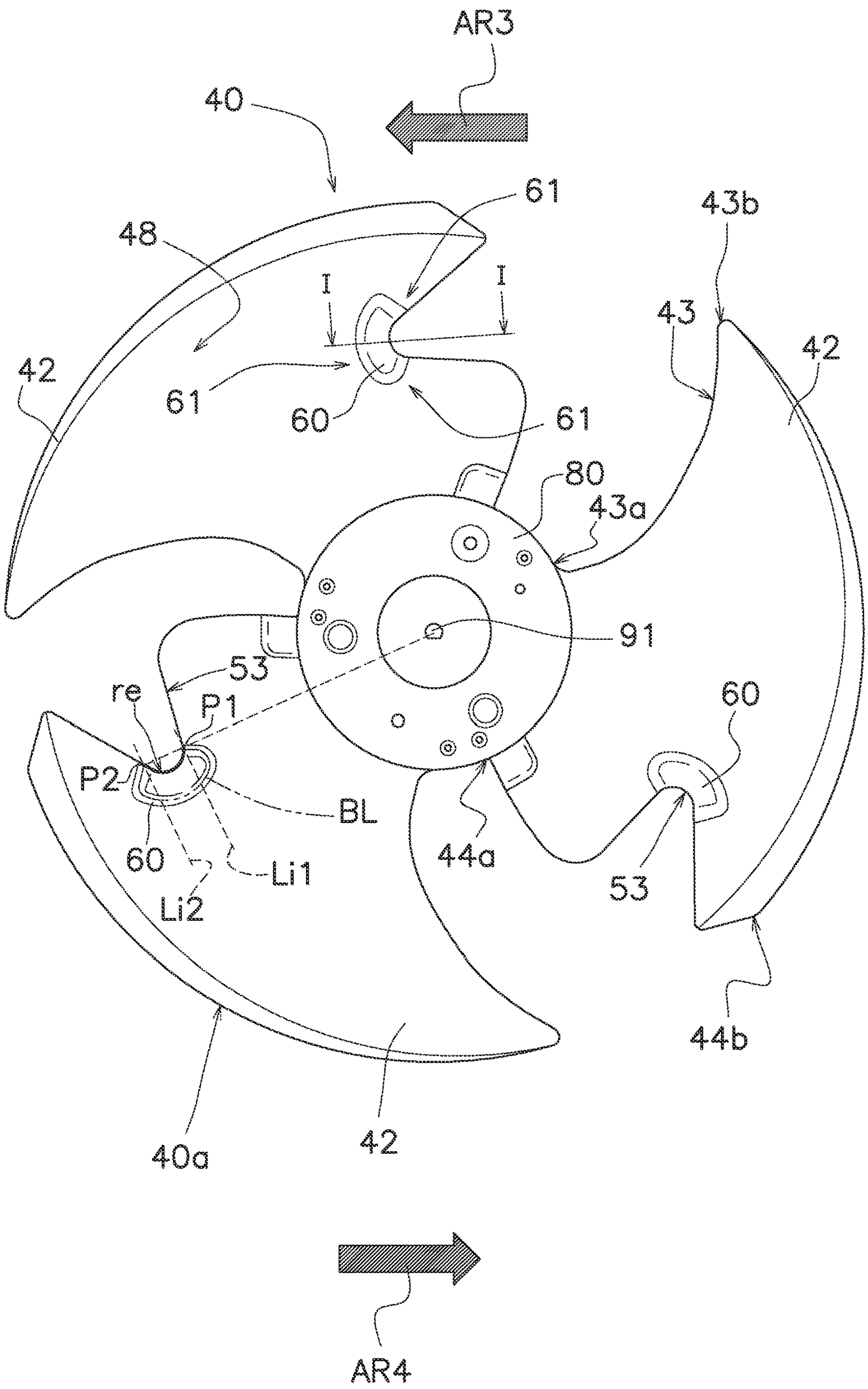
FIG. 5 is a front view of the outdoor fan of FIG. 4.

FIG. 5 is a view showing the outdoor fan 40 viewed from the front side (side of the grill 28*e*). The surface of the blade 42 drawn in FIG. 5 is the pressure surface 48. The rotation direction of the outdoor fan 40 shown in FIG. 5 is in the direction of arrows AR3 and AR4.

Figure 6:
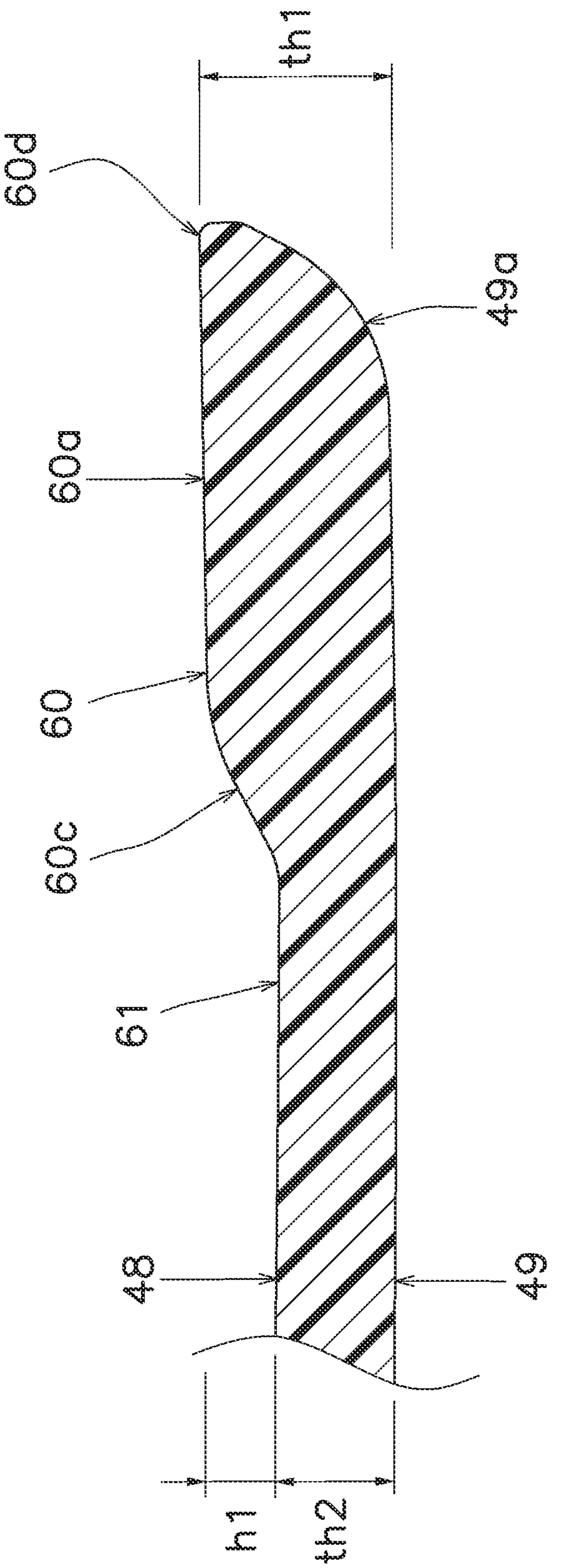
FIG. 6 is an enlarged cross-sectional view of the outdoor fan when cut along the line I-I of FIG. 5.
Figure 7:
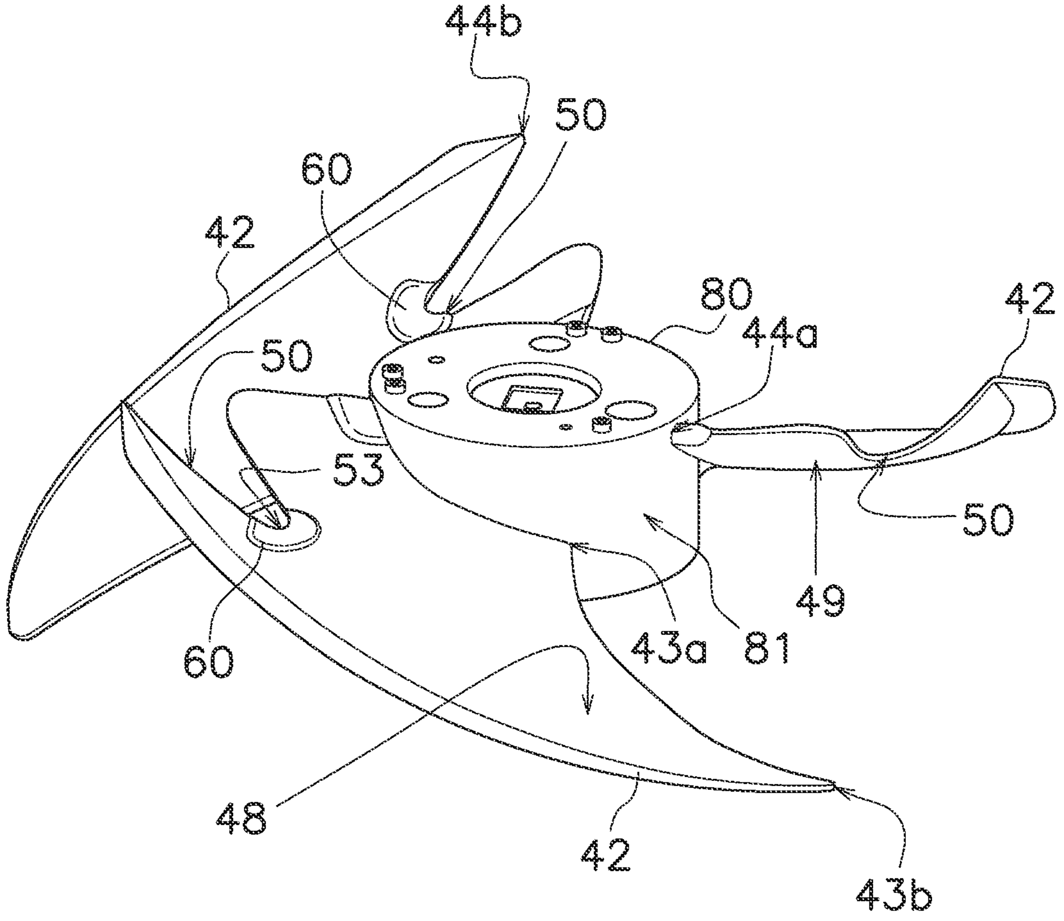
FIG. 7 is a perspective view of the outdoor fan of FIG. 5.

Each blade 42 includes a reinforcing protrusion 60 located at least forwardmost of the rotation direction of the depression 50 and having a wall thickness thicker than a surrounding portion. Each blade 42 includes the reinforcing protrusion 60 on the pressure surface 48. In other words, the reinforcing protrusion 60 protrudes from the pressure surface 48 of each blade 42 and does not protrude from the negative pressure surface 49. A rear end re of the reinforcing protrusion 60 (see FIG. 5) has a portion that substantially agrees with the depression 50 when viewed in the rotating shaft direction. When viewed in the rotating shaft direction, the reinforcing protrusion 60 of the embodiment has substantially a shape obtained by removing a small fan shape having the same center point as a large an shape (shape that partially overlaps the shape of the depression 50) from the large fan shape (hereafter, this shape is called a fan surface shape). The reinforcing protrusion 60 preferably has the fan surface shape substantially. However, the shape of the reinforcing protrusion 60 is not limited to the fan surface shape. FIG. 6 is an enlarged view of a cut surface shape of the reinforcing protrusion 60 cut along the line I-I of FIG. 5 and a surrounding portion 61 thereof. FIG. 7 is a perspective view of the outdoor fan 40.

A wall thickness th1 of the reinforcing protrusion 60 is thicker than a wall thickness th2 of the blade 42 in the surrounding portion 61 of the reinforcing protrusion 60. The wall thickness th2 of the surrounding portion 61 is the distance from the pressure surface 48 to the negative pressure surface 49 in the thinnest portion of the surrounding portion 61. The wall thickness th1 of the reinforcing protrusion 60 is the distance from a flat surface 60*a* of the reinforcing protrusion 60 to the negative pressure surface 49. The place of the flat surface 60*a* is the portion having the thickest wall thickness in the reinforcing protrusion 60.

As shown in FIG. 5, as viewed in the rotating shaft direction, when a first virtual line Li1 and a second virtual line Li2 perpendicular to the radial direction are drawn, the reinforcing protrusion 60 extends radially inside of the first virtual line Li1 and extends radially outside of the second virtual line Li2. The first virtual line Li1 and the second virtual line Li2 respectively pass through a rearmost first endpoint P1 of the rotation direction on the radially inside of the rear end re that substantially overlaps the depression 50, and a rearmost second endpoint P2 on the radially outside of the rear end re.

Here, the above-described first endpoint P1, the second endpoint P2, the first virtual line Li1, and the second virtual line Li2 will be described with reference to FIG. 5. The reinforcing protrusion 60 includes the rear end re that substantially agrees with the depression 50 when viewed in the rotating shaft direction. In FIG. 5, the U-shaped portion on the rear side of the rotation direction of the reinforcing protrusion 60 is the rear end re. The rear end re of the reinforcing protrusion 60 includes the rearmost first endpoint P1 of the rotation direction on the radially inside. The rear end re of the reinforcing protrusion 60 includes the rearmost second endpoint P2 on the radially outside of the rear end re. The first virtual line Li1 passing through the first endpoint P1 and perpendicular to the radial direction can be drawn. The second virtual line Li2 passing through the second endpoint P2 and perpendicular to the radial direction can be drawn. As shown in FIG. 5, the reinforcing protrusion 60 extends radially inside of the first virtual line Li1 and extends radially outside of the second virtual line Li2. Note that the reinforcing protrusion 60 has a configuration in which the rear end re does not overlap the whole of the depression 50, but the rear end re overlaps only some portion of the depression 50.

Here, the above description will be described in a little more detail. As shown in FIG. 6, the reinforcing protrusion 60 has a height h1 from the pressure surface 48 to the flat surface 60*a*. The reinforcing protrusion 60 inclines gently from the flat surface 60*a* to the pressure surface 48. Therefore, it is assumed that a contour when the reinforcing protrusion 60 is sliced thinly at half of the height h1 is a boundary line BL of the reinforcing protrusion 60. For the boundary line BL of the reinforcing protrusion 60, the first endpoint P1 and the second endpoint P2 are defined. There is almost no difference in positions of the first endpoint P1 and the second endpoint P2, whether the boundary line BL is set in this way or not. However, if the first endpoint P1 and the second endpoint P2 need to be determined more accurately, the boundary line BL is used.

The outdoor fan 40 aims to improve blast performance and suppress noise by providing the depression 50 in the trailing edge 44 of each blade 42. Extending the reinforcing protrusion 60 disposed forwardmost of the rotation direction of the depression 50 in directions toward and away from the rotating shaft 91 can reinforce the surrounding portion of the depression 50. As a result, the outdoor fan 40, which is an axial fan, is able to thin the plurality of blades 42 and improve the blast performance.

(4) Detailed Configuration of Outdoor Fan

The outdoor fan 40 is a propeller fan. The outdoor fan 40 includes the hub 80 attached to the rotating shaft 91 of the fan motor 90. The hub 80 includes a cylindrical outer wall 81. The cylindrical outer wall 81 has a substantially constant thickness. The plurality of blades 42 is fixed to the outer wall 81 of the hub 80. In other words, the plurality of blades 42 is formed to protrude from an outer peripheral edge of the hub 80. The hub 80 and the plurality of blades 42 are made of resin. The hub 80 and the plurality of blades 42 are integrally molded. The hub 80 and the plurality of blades 42 are integrally molded, for example, by injection molding.

This embodiment describes a case where the number of blades 42 fixed to the hub 80 is three, but the number of blades 42 is not limited to three. The number of blades 42 may be two, or four or more. A diameter of a circle passing through an outer peripheral portion 40*a* of the outdoor fan 40 is, for example, 500 mm to 700 mm.

The shapes of the plurality of blades 42 are the same as each other. Pitch angles Pt1, Pt2, and Pt3 of the plurality of blades 42 are different from each other. In other words, the outdoor fan 40 is a fan of unequal pitch. The pitch angles Pt1, Pt2, and Pt3 are, for example, 110 degrees, 120 degrees, and 130 degrees, respectively. When viewed in the rotating shaft direction, the leading edge 43 draws a recessed curve with respect to the rotation direction. When viewed in the rotating shaft direction, the leading edge 43 extends out in the rotation direction as approaching the outer peripheral portion 40*a*. In other words, when viewed in the rotating shaft direction, an outer peripheral end 43*b* of the leading edge 43 is located forward, in the rotation direction, of a straight line passing through a connection portion 43*a* between the leading edge 43 and the hub 80 and the rotating shaft 91. The trailing edge 44 of each blade 42 draws a curve Cv1 shown by a long dashed double-short dashed line in FIG. 4, excluding the portion of the depression 50. The curve Cv1 draws a smooth curve protruding in a direction opposite to the rotation direction. When viewed in the rotating shaft direction, an outer peripheral end 44*b* of the trailing edge 44 is located forward, in the rotation direction, of a straight line passing through a connection portion 44*a* between the trailing edge 44 and the hub 80 and the rotating shaft 91. The portion recessed in the rotation direction from the curve Cv1 is the depression 50.

The depression 50 is divided into a first edge 51, a second edge 52, and a corner 53. The corner 53 shows a bow shape when viewed in the rotating shaft direction. The first edge 51 extends from the corner 53 toward the rear of the rotation direction. The second edge 52 is located farther from the rotating shaft 91 than the first edge 51. The second edge 52 extends from the corner 53 toward the rear of the rotation direction.

Each blade 42 is inclined with respect to a plane perpendicular to the rotating shaft 91. The trailing edge 44 of each blade 42 protrudes in the wind blow-out direction (direction from the blade 42 toward the grill 28*e*) from the leading edge 43. In other words, the leading edge 43 is disposed closer to the fan motor 90, and the trailing edge 44 is disposed farther from the fan motor 90. A recessed surface is formed on the pressure surface 48 of each blade 42, and a protruding surface is formed on the negative pressure surface 49. The wall thickness of the blade 42 increases in a connection portion with the hub 80, and decreases toward the outer peripheral portion 40*a*.

The wall thickness th1 of the reinforcing protrusion 60 shown in FIG. 6 is preferably 1.5 times or less of the wall thickness th2 of each blade 42 in the thinnest portion of the surrounding portion 61 of the reinforcing protrusion 60. The wall thickness th2 of each blade 42 is, for example, 3 mm to 8 mm. The wall thickness th1 of the reinforcing protrusion 60 is, for example, a thickness satisfying the condition of 4.5 mm to 12 mm and 1.5 times or less of the wall thickness th2. It is preferable that the height h1 of the reinforcing protrusion 60 from the pressure surface 48 of the blade 42 is 3 mm or less. If the height h1 is too small, the strength of the reinforcing protrusion 60 will be weakened. Therefore, for example, the height h1 from the pressure surface 48 of the blade 42 is preferably set to 1 mm or more and 3 mm or less. Setting the wall thickness th1 and/or height h1 of the reinforcing protrusion 60 as described above makes it possible to suppress the increase in noise while performing reinforcement.

In the cross-sectional shape along the rotation direction shown in FIG. 6, an inclined surface 60*c* between the flat surface 60*a* of the reinforcing protrusion 60 and the pressure surface 48 draws a gentle curve protruding outward. In addition, in the cross-sectional shape along the rotation direction shown in FIG. 6, an inclined surface 49*a* that draws a gentle curve protruding toward the side of the pressure surface 48 is formed from an outer peripheral side end 60*d* of the reinforcing protrusion 60.

The depression 50 formed in the trailing edge 44 of the blade 42 is disposed closer to the outer peripheral portion 40*a* than the connection portion between the blade 42 and the hub 80. In other words, a radius r3 of a circle Cr1 passing through a rotation direction front end 50*a* of the corner 53 is greater than an intermediate radius between a radius r1 of the hub 80 and a radius r2 of the outer peripheral portion 40*a* of the outdoor fan 40 (r3>((r1+r2)/2)).

Figure 8:
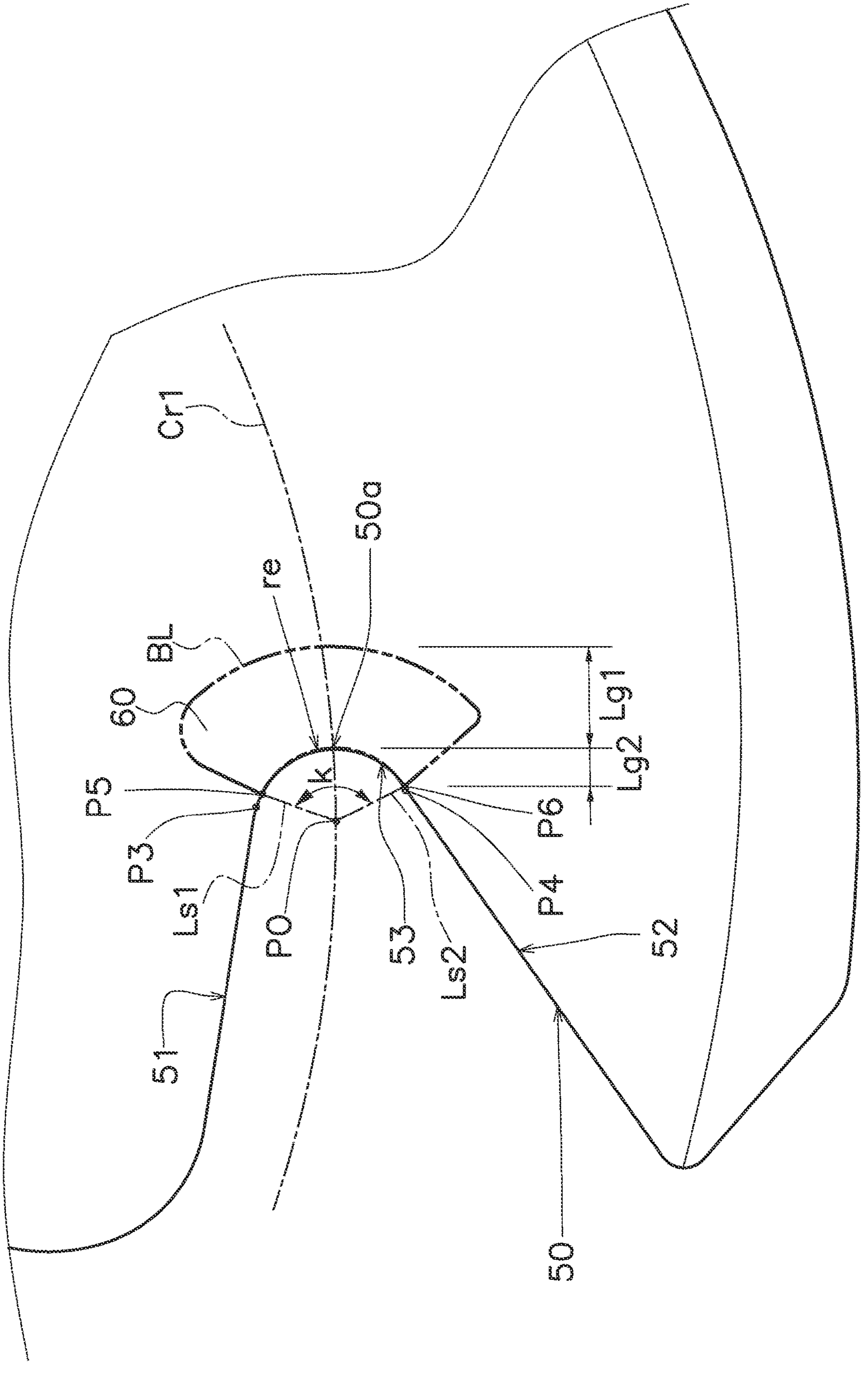
FIG. 8 is a partially enlarged plan view of the outdoor fan for describing a reinforcing protrusion of the outdoor fan of FIG. 5.

The depression 50 shows a wedge shape with the tip rounded to a bow shape when viewed in the rotating shaft direction. The depression 50 is divided into the how-shape corner 53 located forwardmost of the rotation direction, the first edge 51 located radially inside the corner 53, and the second edge 52 located radially outside the corner 53. The reinforcing protrusion 60 extends from at least the corner 53 to approach the rotating shaft 91. At the same time, the reinforcing protrusion 60 extends at least from the corner 53 to move away from the rotating shaft 91. In this embodiment, the corner 53 is arc-shaped. The arc shape is one type of bow shape. FIG. 8 is an enlarged view of the depression 50 and the surroundings thereof. Of the corner 53, the rearmost point of the rotation direction on the radially inside is a third endpoint P3. Of the corner 53, the rearmost point on the radially outside is a fourth endpoint P4. Of the portion where the rear end re and the depression 50 overlap each other, rearmost points in the travel direction are an inner peripheral end P5 and an outer peripheral end P6. This boundary line BL is a line indicating the contour when the reinforcing protrusion 60 is sliced at half of the height h1. The rear end re is set such that an angle k formed by a first line segment Ls1 connecting the inner peripheral end P5 close to the rotating shaft 91 and a center point PO of the arc shape, and a second line segment Ls2 connecting the outer peripheral end P6 far from the rotating shaft 91 and the center point PO is 180 degrees or less. Note that the angle k formed is an angle on the side of the rear end re. The angle k formed is preferably set, for example, to 60 degrees or more and 150 degrees or less.

For the length perpendicular to the radial direction, a length Lg1 of a forward portion of the reinforcing protrusion 60 is longer than a length Lg2 of a rearward portion of the reinforcing protrusion 60. The forward portion is positioned forward of a front end 50*a* of the depression 50 in the rotation direction. The rearward portion is positioned rearward of the front end 50*a* of the depression 50 in the rotation direction. The front end 50*a* is in front of the depression 50 in the rotation direction.

The length Lg1 of the forward portion of the reinforcing protrusion 60 which is forward of the front end 50*a* in the rotation direction is preferably set to, for example, 10 mm or more and 50 mm or less.

(5) Modifications

(5-1) Modification A

Figure 9:
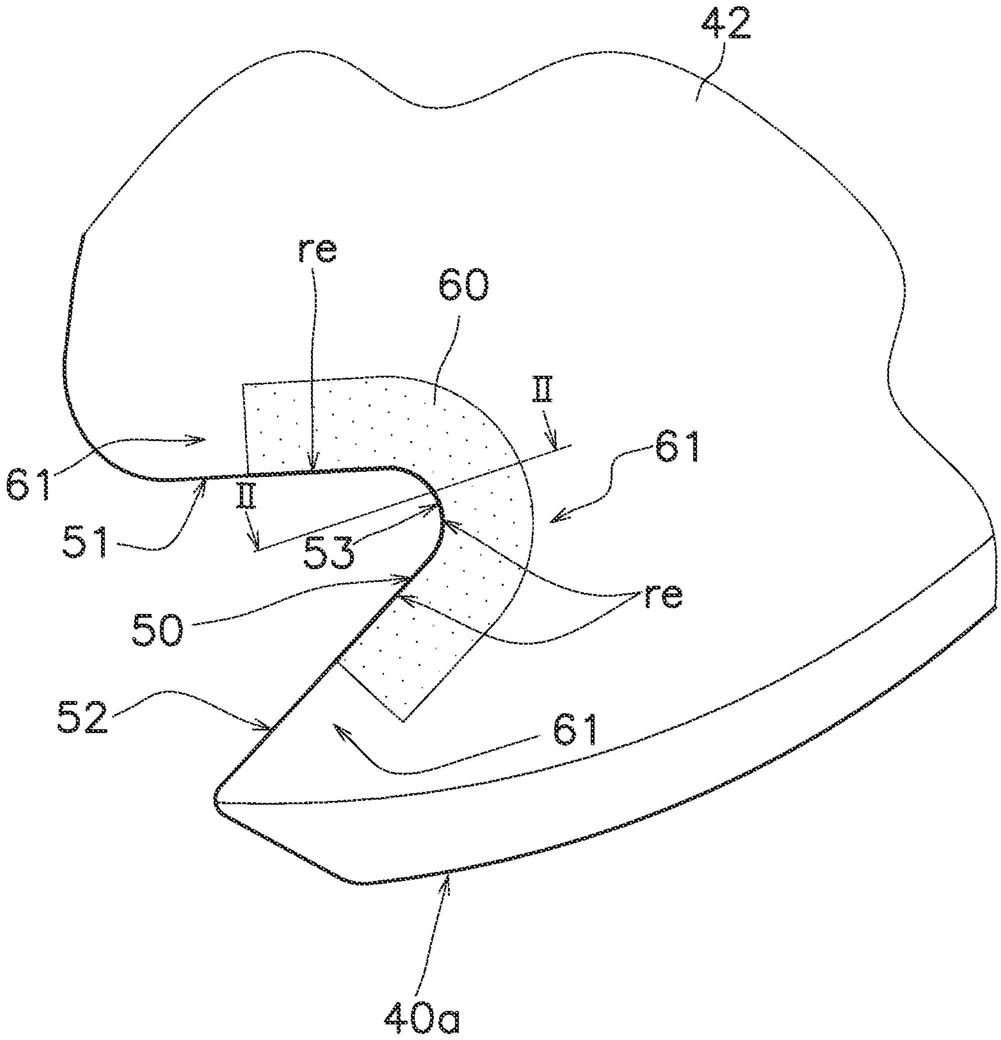
FIG. 9 is a partially enlarged plan view of the outdoor fan for describing the reinforcing protrusion according to a modification.

The above-described embodiment has described the case where the rear end re of the reinforcing protrusion 60 does not span the first edge 51 and the second edge 52. However, as shown in FIG. 9, the rear end re may be configured to span the first edge 51 and the second edge 52. However, the too long rear end re will increase noise, and therefore the rear end re extends halfway of the first edge 51 and the second edge 52. The rear end re is preferably formed so as not to exceed the midpoint of the first edge 51 and the second edge 52. Note that in FIG. 9, the cross-sectional shape when cut along the line is as shown in FIG. 6, as in the embodiment.

(5-2) Modification B

The above-described embodiment has described the case where the reinforcing protrusion 60 is molded integrally with the blade 42 with the same resin as the blade 42. However, as the reinforcing protrusion 60, a member made of a material different from the blade 42 may be attached. For example, the reinforcing protrusion 60 may be formed by adhering a thin plate of resin, metal, or ceramic to the blade 42.

(6) Features

6-1

Figure 10:
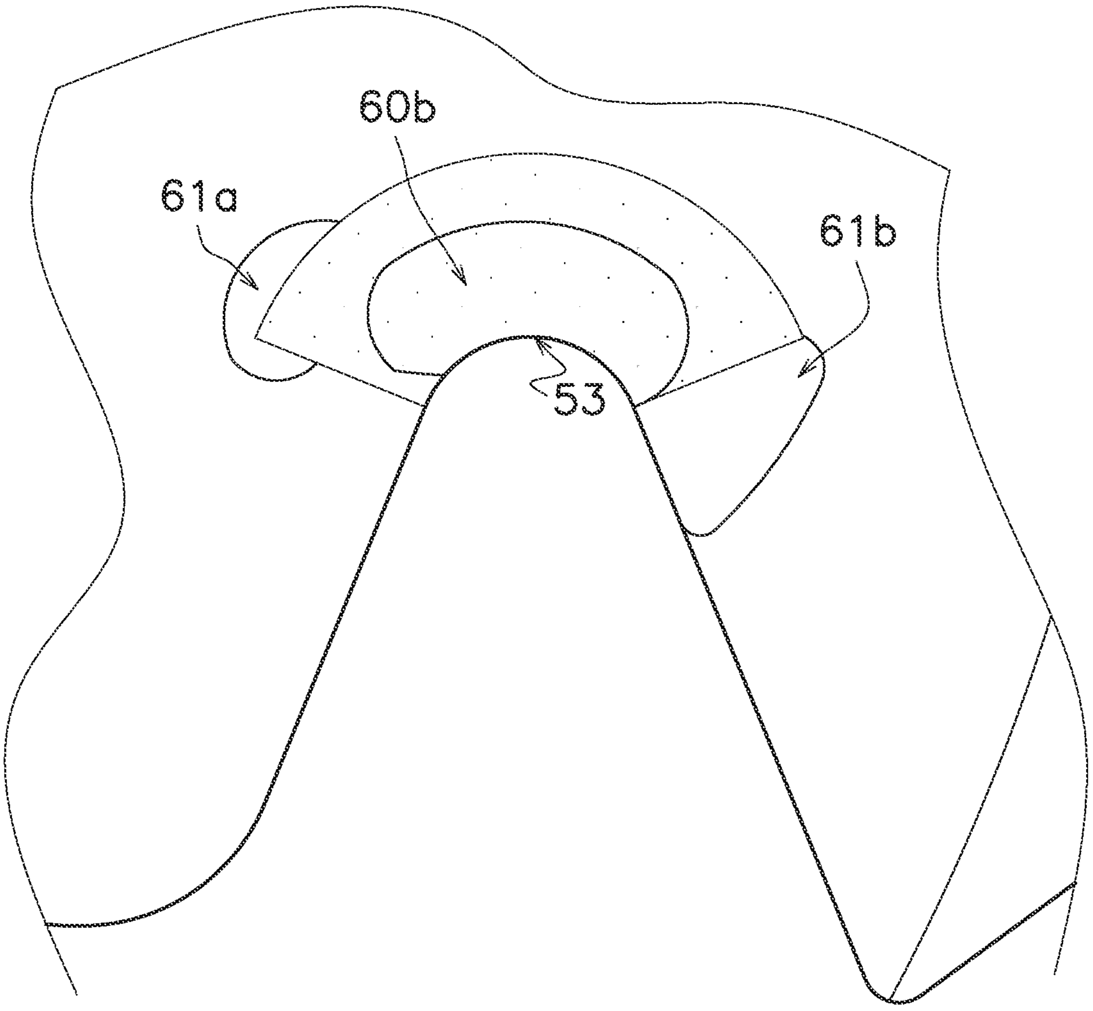
FIG. 10 is a partially enlarged plan view of the outdoor fan for describing reinforcement by the reinforcing protrusion.

The above-described outdoor fan 40, which is an axial fan, includes the depression 50 depressed toward the rotation direction in the trailing edge 44 of each blade 42. With the depression 50, the outdoor fan 40 aims to improve the blast performance and suppress noise. By extending the reinforcing protrusion 60 disposed forwardmost of the rotation direction of the depression 50 in the directions toward and away from the rotating shaft 91, the outdoor fan 40 can reinforce the surroundings of the depression 50 of the blade 42. Specifically, the outdoor fan 40 can disperse the stress concentrated on the corner 53 over a wide range, such as a surrounding portion 61*a* on the inner peripheral side of the fan surface shape reinforcing protrusion 60, a center portion 60*b* of the reinforcing protrusion 60, and a surrounding portion 61*b* on the outer peripheral side of the reinforcing protrusion 60, as shown in FIG. 10. As a result, the outdoor fan 40 can easily thin the blade 42 and improve the blast performance.

6-2

The above-described outdoor fan 40 keeps the wall thickness th1 of the thickest portion of the reinforcing protrusion 60 to 1.5 times or less of the wall thickness th2 of the thinnest portion around the reinforcing protrusion 60, thereby suppressing the increase in noise caused by the reinforcing protrusion 60. Conversely, when the value of (th1÷th2) is 1.6 or more, a remarkable increase in noise may be observed.

6-3

The above-described outdoor fan 40 can suppress the increase in noise caused by the reinforcing protrusion 60 by suppressing the height h1 of the reinforcing protrusion 60 to 3 mm or less. For example, if the height h1 of the reinforcing protrusion 60 is set to 4 mm or more, a remarkable increase in noise may be observed.

6-4

As shown in FIG. 8, by making the length Lg1 of the forward portion of the reinforcing protrusion 60 longer than the length Lg2 of the rear portion, the above-described outdoor fan 40 makes it easy to both suppress the increase in noise and reinforce the surroundings of the corner 53. In the rotation direction, the forward portion of the reinforcing protrusion 60 is positioned forward of the front end 50*a* of the depression 50 and the rear portion of the reinforcing protrusion 60 is positioned rearward of the front end 50*a* of the depression 50.

6-5

The corner 53 of the above-described outdoor an 40 has a bow shape when viewed in the rotating shaft direction. The reinforcing protrusion 60 does not include the portion located rearward of the rearmost third endpoint P3 in the rotation direction on the radially inside of the corner 53, and the portion located rearward of the rearmost fourth endpoint P4 on the radially outside of the corner 53. As a result, it is possible to eliminate the portion extending along the first edge 51 and the second edge 52, and to suppress the increase in noise caused by the reinforcing protrusion 60. Specifically, the reinforcing protrusion 60 shown in FIG. 8 has a smaller blast sound than the reinforcing protrusion 60 shown in FIG. 9, with a difference only in the shape viewed in the rotating shaft direction. Note that the bow shape here means a bent shape like a bow. The bow shape includes, for example, an arc, an elliptical arc, a shape obtained by cutting a part from an egg shape, and a shape obtained by cutting a part from an ellipse.

6-6

The reinforcing protrusion 60 of the above-described outdoor fan 40 does not protrude from the negative pressure surface 59. In this way, by not providing the reinforcing protrusion 60 on the negative pressure surface 59, the outdoor fan 40 can suppress the increase in noise more than when providing on both the pressure surface 58 and the negative pressure surface 59.

6-7

The above-described outdoor fan 40 is provided in a refrigeration cycle apparatus. The refrigeration cycle apparatus is an apparatus that executes a refrigeration cycle. The refrigeration cycle apparatus can be applied to, for example, a heat pump water heater, a refrigerator, and a cooling apparatus for cooling the inside of a refrigerator, in addition to the air conditioner 1. The air conditioner 1 includes the outdoor heat exchanger 23, which is a heat exchanger provided in the refrigerant circuit 10 that executes the refrigeration cycle to exchange heat between the refrigerant circulating in the refrigerant circuit 10 and air. The outdoor fan 40 is an axial fan that creates an air flow for the outdoor heat exchanger 23.

The embodiment of the present disclosure has been described above. It will be understood that various modifications to modes and details can be made without departing from the spirit and scope of the present disclosure recited in the claims.

The invention claimed is:

1. An axial fan rotating around a rotating shaft, the axial fan comprising:

a hub; and a plurality of blades extending in a radial direction from the huh, each of the blades including a leading edge located forward of a rotation direction, a trailing edge located rearward, the trailing edge including a depression depressed forward in the rotation direction, and a reinforcing protrusion located at least forwardmost in the rotation direction of the depression and having a wall thickness thicker than a surrounding portion, as viewed along a rotating shaft direction, when a first virtual line and a second virtual line perpendicular to the radial direction are drawn, the reinforcing protrusion extends radially inside of the first virtual line and extends radially outside of the second virtual line, the first virtual line and the second virtual line respectively passing through a rearmost first endpoint in the rotation direction on a radially, inside of a rear end that substantially overlaps the depression, and a rearmost second endpoint on a radially outside of the rear end.

2. The axial fan according to claim 1, wherein the wall thickness of a thickest portion at a location including the reinforcing protrusion of each of the blades is no more than 1.5 times of the wall thickness of each of the blades at a thinnest portion around the reinforcing protrusion.

3. The axial fan according to claim 2, wherein a height of the reinforcing protrusion from a pressure surface of each of the blades is no more than 3 mm.

4. The axial fan according to claim 2, wherein a length of a forward portion of the reinforcing protrusion is longer than a length of a rearward portion of the reinforcing protrusion, with lengths being measured along a direction perpendicular to the radial direction, the forward portion is positioned forward of a front end of the depression in the rotation direction, the rearward portion is positioned rearward of the front end of the depression in the rotation direction, and the front end is in front of the depression in the rotation direction.

5. The axial fan according to claim 2, wherein the depression is divided into a corner that is bow shaped and located forwardmost of the rotation direction, a first edge located radially inside the corner, and a second edge located radially outside the corner, and the reinforcing protrusion does not include a portion located rearward of a rearmost third endpoint in the rotation direction radially inside the corner, and a portion located rearward of a rearmost fourth endpoint radially outside the corner.

6. The axial fan according to claim 2, wherein the reinforcing protrusions protrude from pressure surfaces of the blades and do not protrude from negative pressure surfaces.

7. The axial fan according to claim 2, wherein the rear end of the reinforcing protrusion has an arc shape, a first line segment connects an inner peripheral end adjacent the rotating shaft and a center point of the arc shape of the rear end, a second line segment connects an outer peripheral end spaced from the rotating shaft and the center, and an angle formed by the first line segment and the second line segment on a side of the rear end is at least 60 degrees and no more than 150 degrees.

8. The axial fan according to claim 1, wherein a height of the reinforcing protrusion from a pressure surface of each of the blades is no more than 3 mm.

9. The axial fan according to claim 8, wherein a length of a forward portion of the reinforcing protrusion is longer than a length of a rearward portion of the reinforcing protrusion, with lengths being measured along a direction perpendicular to the radial direction, the forward portion is positioned forward of a front end of the depression in the rotation direction, the rearward portion is positioned rearward of the front end of the depression in the rotation direction, and the front end is in front of the depression in the rotation direction.

10. The axial fan according to claim 8, wherein the depression is divided into a corner that is bow shaped and located forwardmost of the rotation direction, a first edge located radially inside the corner, and a second edge located radially outside the corner, and the reinforcing protrusion does not include a portion located rearward of a rearmost third endpoint in the rotation direction radially inside the corner, and a portion located rearward of a rearmost fourth endpoint radially outside the corner.

11. The axial fan according to claim 8, wherein the reinforcing protrusions protrude from the pressure surfaces of the blades and do not protrude from negative pressure surfaces.

12. The axial fan according to claim 8, wherein the rear end of the reinforcing protrusion has an arc shape, a first line segment connects an inner peripheral end adjacent the rotating shaft and a center point of the arc shape of the rear end, a second line segment connects an outer peripheral end spaced from the rotating shaft and the center, and an angle formed by the first line segment and the second line segment on a side of the rear end is at least 60 degrees and no more than 150 degrees.

13. The axial fan according to claim 1, wherein a length of a forward portion of the reinforcing protrusion is longer than a length of a rearward portion of the reinforcing protrusion, with lengths being measured along a direction perpendicular to the radial direction, the forward portion is positioned forward of a front end of the depression in the rotation direction, the rearward portion is positioned rearward of the front end of the depression in the rotation direction, and the front end is in front of the depression in the rotation direction.

14. The axial fan according to claim 13, wherein the length of the forward portion forward of the reinforcing protrusion is at least 10 mm and no more than 50 mm.

15. The axial fan according to claim 13, wherein the depression is divided into a shaped corner that is bow shaped and located forwardmost of the rotation direction, a first edge located radially inside the corner, and a second edge located radially outside the corner, and the reinforcing protrusion does not include a portion located rearward of a rearmost third endpoint in the rotation direction radially inside the corner, and a portion located rearward of a rearmost fourth endpoint radially outside the corner.

16. The axial fan according to claim 13, wherein the reinforcing protrusions protrude from pressure surfaces of the blades and do not protrude from negative pressure surfaces.

17. The axial fan according to claim 1, wherein the depression is divided into a corner that is bow shaped and located forwardmost of the rotation direction, a first edge located radially inside the corner, and a second edge located radially outside the corner, and the reinforcing protrusion does not include a portion located rearward of a rearmost third endpoint the rotation direction radially inside the corner, and a portion located rearward of a rearmost fourth endpoint radially outside the corner.

18. The axial fan according to claim 1, wherein the reinforcing protrusions protrude from pressure surfaces of the blades and do not protrude from negative pressure surfaces.

19. The axial fan according to claim 1, wherein the rear end of the reinforcing protrusion has an arc shape, a first line segment connects an inner peripheral end adjacent the rotating shaft and a center point of the arc shape of the rear end, a second line segment connects an outer peripheral end spaced from the rotating shaft and the center, and an angle formed by the first line segment and the second line segment on a side of the rear end is at least 60 degrees and no more than 150 degrees.

20. A refrigeration cycle apparatus including the axial fan of claim 1, the refrigeration cycle apparatus further comprising:

a refrigerant circuit including a heat exchanger and executing a refrigeration cycle.

* * * * *